US006989523B2

(12) United States Patent
Beausoleil et al.

(10) Patent No.: US 6,989,523 B2
(45) Date of Patent: Jan. 24, 2006

(54) PHOTON NUMBER RESOLVING SYSTEMS AND METHODS

(75) Inventors: Raymond G. Beausoleil, Redmond, WA (US); William J. Munro, Bristol (GB); Timothy P. Spiller, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 327 days.

(21) Appl. No.: 10/412,019

(22) Filed: Apr. 11, 2003

(65) Prior Publication Data

US 2004/0200949 A1 Oct. 14, 2004

(51) Int. Cl.
*H01L 31/00* (2006.01)

(52) U.S. Cl. ................ 250/214.1; 250/214 R
(58) Field of Classification Search ............. 250/214.1, 250/216, 214 R, 336.1
See application file for complete search history.

(56) References Cited

U.S. PATENT DOCUMENTS 5,740,117 A 4/1998 Bona et al.
6,741,374 B2 * 5/2004 Pittman et al. ............. 359/108

OTHER PUBLICATIONS

Chiao, Raymond Y. and Milonni, Peter W ., " Fast Light, Slow Light," Optics and Photonics New s, pp. 26-30 (Jun. 2002).
D'Ariano, G.M. et al., " State Preparation By Photon Filtering," arXiv:quant-ph/9906077v1, pp. 1-9 (Jun. 21, 1999).
Juzeliunas, G. et al., " Storing and Releasing Light in a Gas of Moving Atoms," arXiv:quant-ph/0210123v1, pp. 1-4 (Oct. 16, 2002).
Leonhardt, Ulf, " A Primer to Slow Light," arXiv:gr-qc/0108085v2, pp. 1-20 (Jan. 9, 2002).
Lloyd, Seth et al., " Quantum Computation Over Continuous Variables," Physical Review Letters, vol. 82, No. 8, pp. 1784-1787 (Feb. 22, 1999).
Pittman, T.B. and Franson, J.D., " Cyclical Quantum Memory for Photonic Qubits," pp. 1-4 (Jul. 8, 2002).
Rostovtsev, Yuri et al., " Slow , Ultraslow , Stored, and Frozen Light," Optics and Photonics News, pp. 44-48 (Jun. 2002).
Wang, Hai et al., " Enhanced Kerr Nonlinearity via A tomic Coherence in a Three-Level A tomic System," Physical Review Letters vol. 87, No. 7, pp. 073601-1 to 073601-4 (Aug. 13, 2001).
Imoto N et al.: "Quantum nondemolition measurement of the photon number via the optical Kerr effect" Physical Review A (General Physics) USA vol. 32, No. 4, Oct. 1985 p 2287.

(Continued)

*Primary Examiner*—Que T. Le

(57) ABSTRACT

Photon resolving detectors with near unit detection efficiency distinguish between a target state including n photons and a target state including n+1 photons by measuring a phase shift that a probe photon state receives in a quantum gate. The detection does not destroy the photons from the target state, so that photons can be used after detection. A system using a non-destructive detector in conjunction with one or more single photon storage systems can store a determined number of photons and release one or more stored photons when required to produce a photon state including a determined number of photons.

29 Claims, 3 Drawing Sheets

OTHER PUBLICATIONS

Schmidt H et al: "Giant Kerr nonlinearities obtained by electromagnetically induced transparency" Optical Letter Opt. Soc. America USA, vol. 21, No. 23, Dec. 1, 1996, p. 1936-1938.

Lukin M D et al: "Nonlinear optics and quantum entanglement of ultraslow signal photons" Physical Review letters APS USA, vol. 84, No. 7, Feb. 14, 2000, p. 1419-1422.

Grangier P et al: "Quantum non-demolition measurements in optics" Nature Macmillan Magazines UK, vol. 396, No. 6711, Dec. 10, 1998, p. 537-542.

Howell J C et al: "Nondestructive single-photon trigger" Physical Review A (Atomic, Molecular, and Optical Physics) APS Through AIP USA, vol. 62, No. 3, Sep. 2000, p. 032311/1-3.

* cited by examiner

PHOTON NUMBER RESOLVING SYSTEMS AND METHODS

BACKGROUND

Interest in quantum information processing has grown dramatically in recent years because of successes in developing quantum systems and the expected capabilities of the technology. In particular, working quantum cryptosystems have been developed, and if large (many qubit) quantum computers can be built, quantum computers will perform many processing tasks much more efficiently than can classical computers. Quantum processors having tens or hundreds of qubits, for example, would be able to perform quantum simulations unreachable with any classical machine. Such quantum processors also have the potential to extend the working distances and applicability of quantum communications.

Many candidate technologies for quantum computing hardware are currently being studied. Whichever technology turns out to be the most practical, quantum coherent communications will likely be needed for linking separate quantum computers. Coherent electromagnetic fields (as photonic qubits) seem ideal for communications between quantum computers and for general quantum communications because light, traveling either down optical fibers or through free space, can carry quantum information over large distances. Further, some quantum computing may be performed directly on photonic qubits, using non-linear or linear quantum optical processes.

Proposed quantum information systems that use photon states often require detectors capable of efficiently detecting the presence or absence of one or a few photons. The optical quantum computation architecture proposed by E. Knill, R. Laflamme, and G. Milburn, Nature 409, 46 (2001), for example, requires a high-efficiency photon detector that is more than 99.99% efficient at distinguishing quantum states including 0, 1, or 2 photons. A miscount of the number of photons or a failure to detect the presence of a photon causes an inaccurate measurement of the photon state and an error in the quantum information. Such errors, when tolerable, require error correction schemes that may be expensive to implement.

Current commercial single photon detectors generally rely to a greater or lesser extent on the photoelectric effect. With the photoelectric effect, photons incident on the surface of a metal, a semiconductor, or another material free bound electrons from atoms of the material. The excited electrons enter the surrounding space or a conduction band, where the electrons are collected as current that can be amplified and measured.

The photoelectric current from a single photon is small and difficult to detect. The best commercial photon detectors for visible light are currently about 90% efficient at detecting single photons, and at present, detectors for photons having wavelengths between 1.3 and 1.5 $\mu$m are only about 30% efficient. These efficiencies are too low for many quantum information systems. Additionally, the best efficiencies achieved for the visible-spectrum photon detectors require cooling the detectors down to about 6° K, and such detectors still provide relatively high "dark count" rates (e.g., high background noise when no photon is incident.)

Another drawback of most photon detectors is that the detectors absorb the photons being measured or detected. The photon detectors can thus only be used at the end of a process, when the measured photons are no longer required or when the resulting measurement controls a condition of the system.

Accordingly, quantum information systems require photon detectors that are highly efficient at detecting photons and that can accurately distinguish the number of photons in a quantum signal. Ideally, the detectors would be non-destructive so that photon states could be used after the presence or number of photons has been inferred.

SUMMARY

In accordance with an aspect of the invention, a photon detector includes a photonic gate that has a first input for a target photon state being measured and a second input for a probe photon state. The photonic gate creates a change in the probe photon state that depends on the number of photons in the target photon state. The effect on the probe photon state can then be measured to determine the number of photons in the target photon state.

BRIEF DESCRIPTION OF THE DRAWINGS

Use of the same reference symbols in different figures indicates similar or identical items.

DETAILED DESCRIPTION

A high efficiency, non-destructive, quantum photon detector efficiently resolves the number of photons in a target state using a photonic gate such as a phase gate in which the target state and a probe state coherently interact. The interaction changes the probe state without destroying the target state. A homodyne or heterodyne measurement of the change that the photonic gate introduces in the probe state then indicates the presence and/or the number of photons in the target state. The number of photons in a target state can thus be detected without requiring a measurement that destroys or absorbs the photons in the target state.

Figure 1:
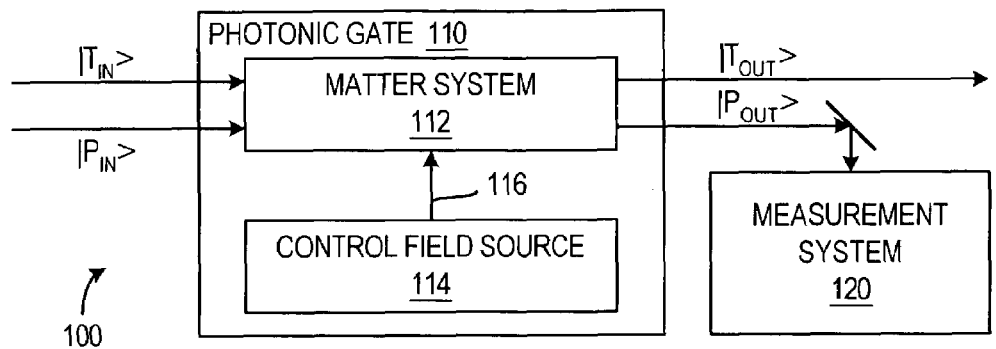
FIG. 1 is a block diagram of a number-resolving photon detector in accordance with an embodiment of the invention.

FIG. 1 illustrates a photon detector 100 in accordance with an embodiment of the invention. Photon detector 100 includes a photonic gate 110 and a measurement system 120. For a measurement, a target photon state $|T_{IN}\rangle$ and a probe photon state $|P_{IN}\rangle$ are input to photonic gate 110, where the photon states interact before exiting as evolved states $|T_{OUT}\rangle$ and $|P_{OUT}\rangle$. Photonic gate 110 is preferably such that the interaction of photon states $|T_{IN}\rangle$ and $|P_{IN}\rangle$ in photonic gate 120 causes a phase shift in probe state $|P_{IN}\rangle$, and the introduced phase shift depends on the number of photons in state $|T_{IN}\rangle$. However, output probe state $|P_{OUT}\rangle$ may alternatively differ in intensity or some other measurable property from input probe state $|P_{IN}\rangle$. In one alternative embodiment, photonic gate 110 causes scattering of a portion of the probe state where the scattering depends on the number of photons in target state $|T_{IN}\rangle$.

Measurement system 120 can use homodyne or heterodyne measurement techniques to measure output probe photon state $|P_{OUT}\rangle$ and determine the change that arose in photonic gate 110. The number of photons in target state $|T_{OUT}\rangle$ is then inferred from the measurement of probe state $|P_{OUT}\rangle$. Target state $|T_{OUT}\rangle$, which is output from photonic gate 120, is thus in a Fock state, i.e., in a quantum state having a determined photon number. Input target state $|T_{IN}\rangle$ could have been originally in a Fock state, in which case the input and output target states are the same, or input target state $|T_{IN}\rangle$ could have been in a state that is a superposition of Fock states, in which case the measurement collapses input target state $|T_{IN}\rangle$ to output target state $|T_{OUT}\rangle$.

The specific embodiment of photonic gate 110 illustrated in FIG. 1 uses a matter system 112 and a control field source 114 suitable for providing electromagnetically induced transparency (EIT). EIT is a well-known phenomenon in which an atom, molecule, or other condensed matter system that would normally absorb photons of a particular frequency is made transparent to the photons of that frequency through application of one or more electromagnetic fields having other frequencies. EIT generally requires a matter system having at least three quantum energy levels that are available for interactions with photons.

Figure 2A:
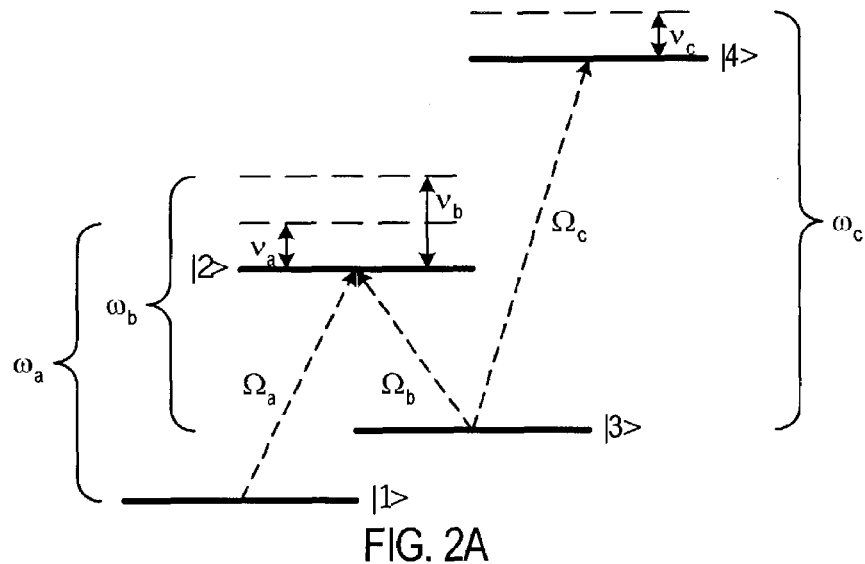
FIGS. 2A and 2B respectively illustrate semiclassical energy levels and a quantum energy manifold for a matter system suitable for use in the photon detector of FIG. 1.

In an exemplary embodiment, matter system 112 includes at least one atom, molecule, or other structure having four or more quantum energy levels, and the angular frequencies $\omega_a$, $\omega_b$, and $\omega_c$ respectively of target state $|T_{IN}\rangle$, a control field 116, and probe state $|P_{IN}\rangle$ are such that the photons couple to corresponding transitions between the quantum energy levels of matter system 112. FIG. 2A illustrates the energy levels of energy states $|1\rangle$, $|2\rangle$, $|3\rangle$, and $|4\rangle$ of a four-level matter system relative to the energies of photons having angular frequencies $\omega_a$, $\omega_b$, $\omega_c$. With the matter system of FIG. 2A, photons of angular frequency $\omega_a$ couple atomic energy state $|1\rangle$ to energy state $|2\rangle$. Photons of angular frequency $\omega_b$ and $\omega_c$ couple the metastable energy state $|3\rangle$ to energy states $|2\rangle$ and $|4\rangle$, respectively.

The relative order of the energy levels illustrated in FIG. 2A is merely an example, and more generally, a reordering of energy levels would still permit EIT. In particular, although FIG. 2A shows the fourth energy state $|4\rangle$ as being higher in energy than the second energy state $|2\rangle$, the second state $|2\rangle$ as being higher in energy than the third energy state $|3\rangle$, and the third energy state $|3\rangle$ as being higher in energy than the first energy state $|1\rangle$, EIT can be produced with a matter system that provides an arbitrary ordering of these energy levels.

Third energy state $|3\rangle$, is metastable in that no single-photon spontaneous emission is permitted. Such metastability may result, for example, if the spin/angular momentum of energy state $|3\rangle$ and available lower energy states is such that a conservation law forbids emission of a single photon during a transition of the matter system from energy state $|3\rangle$ to a lower energy state. Spontaneous transitions from the fourth energy state (e.g., to the first or second state) is similarly suppressed by selecting a matter system for which the fourth energy state is metastable or by at least partially surrounding the four level matter system with a photonic bandgap crystal that does not permit propagation of photons having angular frequencies corresponding to the transitions from the fourth energy state $|4\rangle$.

Detuning parameters $\nu_a$, $\nu_b$, and $\nu_c$ indicated the respective amount of detuning of angular frequencies $\omega_a$, $\omega_b$, and $\omega_c$ from resonances of the energy level transitions of the matter system as indicated in Equations 1. In Equations 1, the energy differences between states $|1\rangle$ and $|2\rangle$, between $|3\rangle$ and $|2\rangle$, and between $|3\rangle$ and $|4\rangle$ are $\omega_{12}$, $\omega_{32}$, and $\omega_{34}$, respectively.

$$\omega_a = (\omega_{12} + \nu_a)$$

$$\omega_b = (\omega_{32} + \nu_b)$$

$$\omega_c = (\omega_{34} + \nu_c)$$

Figure 2B:
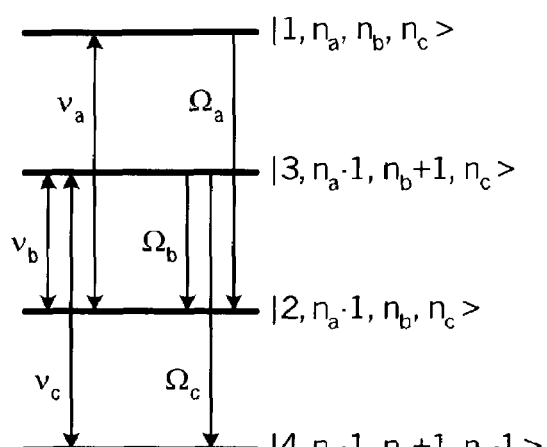

Equations 1:

FIG. 2B shows a manifold corresponding to product states $|X, A, B, C\rangle$, where X indicates the energy level 1 to 4 of the matter system, and A, B, and C indicate the numbers $n_a$, $n_b$, and $n_c$ of photons of angular frequencies $\omega_a$, $\omega_b$, and $\omega_c$, respectively. The illustrated manifold includes the states closest in energy to a matter system in state $|1\rangle$, with $n_a$ photons of angular frequency $\omega_a$, $n_b$ photons of angular frequency $\omega_b$, and $n_c$ photons of angular frequency $\omega_c$. A spontaneous emission of a photon to the surrounding environment would move the system to an energy level in a manifold that is similar to the manifold illustrated in FIG. 2B but having fewer photons of the type lost to the environment.

A paper by R. Beausoleil, A. Kent, W. Munro, and T. Spiller entitled "Applications of Coherent Population Transfer to Classical and Quantum Information Processing," "http://xxx.lanl.gov/abs/quant-ph/0302109" and a co-owned U.S. patent application Ser. No. 10/364,987, entitled "Quantum Information Processing Using Electromagnetically Induced Transparency", which are hereby incorporated by reference in their entirety, further describe use of four-level matter systems having energy levels as illustrated in FIGS. 2A and 2B in implementations of qubit gates. The incorporated references particularly describe the structure of a two-qubit phase gate suitable for use as photonic gate 110 in detector 100 of FIG. 1.

The four-level matter system of FIG. 2A interacting with photons of angular frequencies $\omega_a$ and $\omega_c$ creates a Hamiltonian with an effective crossed-Kerr non-linearity of the form given by Equation 2A. In Equation 2A, creation operator $a^\dagger$ and annihilation operator a respectively create and destroy a photon of angular frequency $\omega_a$, and creation operator $c^\dagger$ and annihilation operator c respectively create and destroy a photon of angular frequency $\omega_c$. Constant $\chi$ indicates the strength of the interaction and generally depends on detuning parameters $\nu_a$, $\nu_b$, and $\nu_c$, the Rabbi frequencies $\Omega_a, \Omega_a$, and $\Omega_a$ associated with transitions, and the specific characteristics of the matter system.

$$H = \chi a^\dagger a c^\dagger c$$

Equation 2A:

Condensed matter systems can more generally give rise to other non-linear photon interactions that are suitable for use in detectors. Equation 2B, for example, illustrates a more general representation of a term of a Hamiltonian providing a non-linear interaction between photons of angular frequencies $\omega_a$ and $\omega_c$. In Equation 2B, $f(a^\dagger, a)\cdot$ is a function of creation and annihilation operators $a^\dagger$ and a, and $g(c^\dagger, c)$ is a function of creation and annihilation operators $c^{554}$ and c. Preferably, $f(a^\dagger, a)\cdot$ is a power of photon number operator $a^\dagger a$, e.g., $(a^{\dagger a})^\lambda$ for some constant $\lambda$, so that the effect of the interaction on the state of photons of angular frequency $\omega_c$ directly depends on the number of photons of angular frequency $\omega_a$.

$$H = \chi \cdot f(a^\dagger, a) \cdot g(c^\dagger, c)$$

Equation 2B:

Optical systems that provide a general non-linear interaction between photon states in two distinct modes (e.g., spatially separated modes or distinct angular frequency modes $\omega_a$ and $\omega_c$) may be built from a sequence of optical gates, with or without using an EIT system. In the context of quantum computing, Seth Lloyd and Samuel L. Baunstein, "Quantum Computations over Continuous Variables," Phys. Rev. Lett. 82, 1784 (1999), which is hereby incorporated by reference in its entirety, describes constructing a sequence of gates that creates an arbitrary polynomial Hamiltonian (e.g., $f(a^\dagger,a)$ or $g(c^\dagger,c)$) for a single photon mode. The basic gates in the sequence for a single mode include (1) linear devices such as beam splitters and phase shifters, (2) quadratic devices such as squeezers, and (3) non-linear devices of third or higher order such as Kerr-effect fibers, atoms in optical cavities, and non-linearities generated through measurement. Such systems for two separate modes can be combined via one or more beam splitters to provide cross mode interactions and create a desired non-linear interaction $f(a^\dagger,a) \cdot g(c^\dagger,c)$ between the modes.

In the exemplary embodiment of detector 100 described herein, matter system 112 includes a four-level system that has quantum energy levels related to the photon energies as illustrated in FIG. 2A and that provides a crossed-Kerr non-linearity of the form given in Equation 2A. However, other matter systems that provide other non-linear interactions such as the interaction of Equation 2B can similarly alter a probe photon state in an easily distinguishable manner for determination of the number of photons in a target state. Such matter systems are therefore suitable for detectors in accordance with alternative embodiments of the invention.

The exemplary embodiment of detector 100 can distinguish state $|0\rangle_a$ from state $|1\rangle_a$ if target state $|T_{IN}\rangle$ is in the Fock state $|0\rangle_a$ or $|1\rangle_a$, that is a state including zero or one photon of angular frequency $\omega_a$. More generally, target state $|T_{IN}\rangle$ could contain up to N photons (where N is arbitrary), and detector 100 can efficiently determine the number N of photons. For the determination of the number of photons of angular frequency $\omega_a$ in target state $|T_{IN}\rangle$, a laser or other control field source 114 drives control field 116 at angular frequency $\omega_b$, which corresponds to the transition between the second and third energy levels of the four-level atom. Probe state $|P_{IN}\rangle$ can be a Fock state or a large amplitude coherent or squeezed state containing large number (e.g., $10^2$ to $10^5$ or more) of photons of angular frequency $\omega_c$, which corresponds to the transition between the third and fourth energy levels of the four level atom. Alternatively, the roles of angular frequencies $\omega_a$ and $\omega_c$ can be interchanged because of symmetry of the Hamiltonian term of Equation 2A.

Probe state $|P_{IN}\rangle$ is preferably a state providing a high intensity or large number of photons. In one exemplary embodiment described below, probe state $|P_{IN}\rangle$ is a coherent state $|\xi\rangle_c$. The coherent state $|\xi\rangle_c$ is used as an example since coherent states are easily produced (or approximated) by the output from a laser. However, other types of photon states such as squeezed states or Fock states could equally be employed as probe state $|P_{IN}\rangle$.

Equations 3 mathematically represents coherent state $|\xi\rangle_c$. In Equations 3, $\xi$ represents the state amplitude, the subscript c designates the state contains photons of angular frequency $\omega_c$, $|n\rangle_c$ is a Fock state containing n photons, and $n_v$ is the expectation value of the number of photon in the coherent state $|\xi\rangle_c$.

Equations 3: $|\xi\rangle_c = e^{-\frac{1}{2}|\xi(t)|^2} \sum_{n=0}^{\infty} \frac{\xi^n(t)}{\sqrt{n!}} |n\rangle_c$ $\xi(t) = \sqrt{\langle n_V \rangle} \, e^{-i\omega_c t}$ When probe state $|P_{IN}\rangle$ is a coherent state $|\xi\rangle_c$ and the target state is a Fock state containing n photons, the initial state $|T_{IN}\rangle|P_{IN}\rangle$ of detector 100 is $|n\rangle_a|\xi\rangle_c$, where subscripts a and c respectively represent photons of angular frequencies $\omega_a$ and $\omega_c$. (As indicated above, four-level matter system 112 is classically pumped with photons of angular frequency $\omega_b$.) The effect of the crossed-Kerr non-linearity of Equation 2A now causes the photon states to evolve in time according to Equation 4.

$|T_{OUT}\rangle|P_{OUT}\rangle = \exp\{i\chi t a^\dagger a c^\dagger c\}|n\rangle_a|\xi\rangle_c = |n\rangle_a|\xi e^{in\chi t}\rangle_c$     Equation 4:

Equation 4 clearly shows that if no photon of angular frequency $\omega_a$ is present (n=0) in target state $|T_{IN}\rangle$ then no phase shift occurs ($e^{in\chi t}=1$). However, if one (or more) photon of angular frequency $\omega_a$ is present in target state $|T_{IN}\rangle$, coherent state $|\xi\rangle_c$ evolves to $|\xi e^{in\chi t}\rangle_c$. The size of the phase shift $e^{in\chi t}$ depends directly on the number n of photons in target state $|T_{IN}\rangle$ as well as on coupling $\chi$ and the interaction time t of the photons with the matter systems. Since the coupling $\chi$ and interaction time t can be made constant for a particular system, a measurement of the phase shift indicates the number of photons in target state $|T_{IN}\rangle$.

Figure 3A:
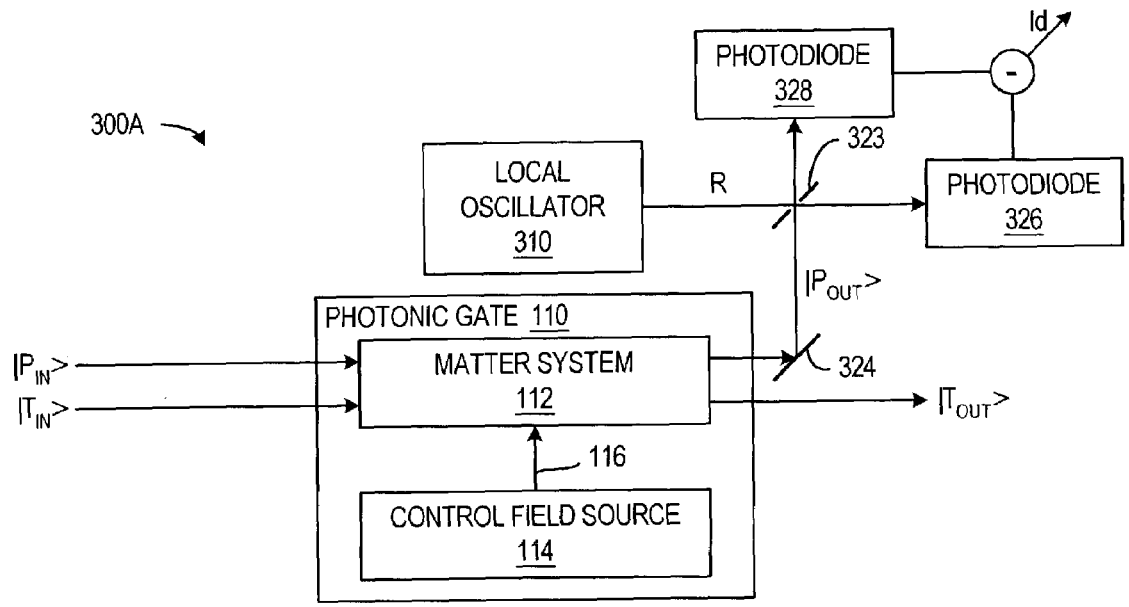
FIG. 3A is a block diagram of a number-resolving photon detector in accordance with an embodiment of the invention using homodyne measurement techniques to measure a phase shift in a probe photon state.

If value $\xi$ for the coherent state is initially real then a measurement system 300A of FIG. 3A can use homodyne measurement techniques to measure the position $X=c+c^\dagger$ and momentum $Y=(c^\dagger-c)/i$ quadratures $\langle X \rangle$ and $\langle Y \rangle$ for probe state $|P_{OUT}\rangle$. The homodyne measurement in system 300A uses an oscillator or laser 310 to generate a reference beam R that is out of phase with probe state $|P_{OUT}\rangle$ by an adjustable phase angle $\theta$. A 50/50 beam splitter 323 in at the intersection of the two beams causes subtraction of reference beam R from probe state $|P_{OUT}\rangle$ along a path to a photodiode 326 and addition of reference beam R to probe state $|P_{OUT}\rangle$ along a path to a photodiode 328. A difference Id in the resulting currents of photodiodes 236 and 238 is proportional to position quadrature $\langle X \rangle$ when phase angle $\theta$ is zero and is proportional to momentum quadrature $\langle Y \rangle$ when phase angle $\theta$ is $\pi/2$.

Based on Equation 4, the measured quadratures $\langle X \rangle$ and $\langle Y \rangle$ are related to the number n of photons in target state $|T_{IN}\rangle$ (and to the constants $\xi$, $\chi$, and t) as respectively indicated in Equations 5 and 6.

$\langle X \rangle = 2\xi\cos(n\chi t)$     Equation 5:

$\langle Y \rangle = 2\xi\sin(n\chi t)$     Equation 6:

If no photon of angular frequency $\omega_a$ is present (n=0), the measured quadrature $\langle X \rangle$ is equal to twice value $\xi$ and measured quadrature $\langle Y \rangle$ is zero. If one photon of angular frequency $\omega_a$ is present (n=1), interaction time t can be controlled so that quadrature $\langle X \rangle$ is zero and quadrature $\langle Y \rangle$ is $2\xi$. (The interaction time t can be controlled, for example, through the number of four-level atoms or molecules in matter system 112 and/or through adjustment of detuning parameters $\nu_a$, $\nu_b$, and $\nu_c$.) Thus, for an appropriately controlled reaction time t, measured quadratures $\langle X \rangle$ and $\langle Y \rangle$ provide definite and easily distinguished signatures indicating the presence or absence of a photon.

The interaction time t is not required to be such that $\sin(n\chi t)$ is one. If the product $\chi t$ is small enough that the small angle approximation applies to Equation 6, the momentum quadrature $<Y>$ is approximately $2\xi\chi t$ for a single photon of angular momentum $\omega_a$ in target state $|T_{IN}>$. If $\xi$ is sufficiently large, the measurement of quadrature $<Y>$, which is about $2\xi\chi t$, will be much larger than signal noise, and the one-photon target state is efficiently distinguished from the target state containing no photons.

Figure 3B:
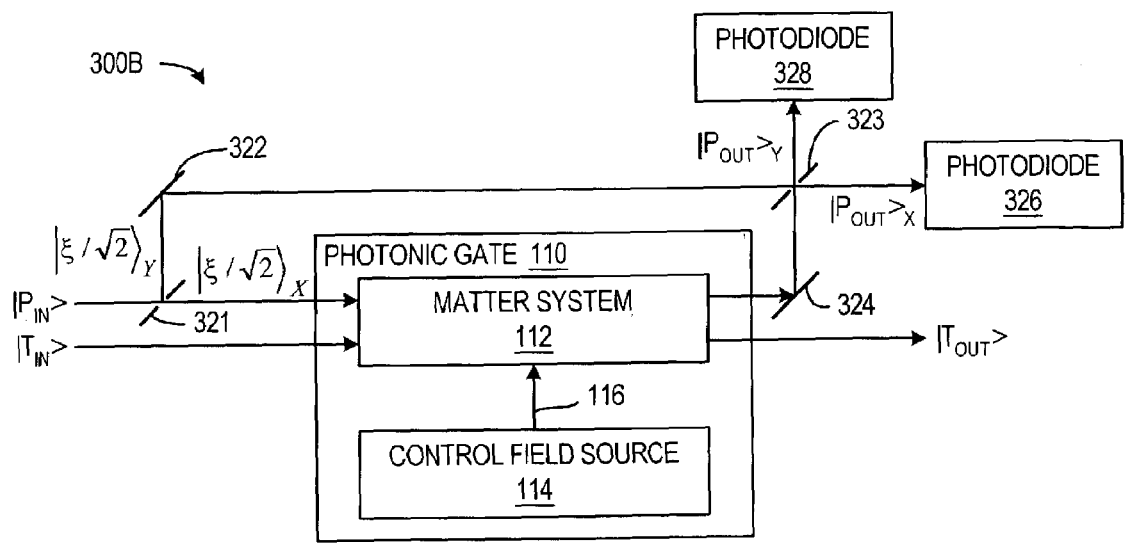
FIG. 3B is a block diagram of a number-resolving photon detector in accordance with an embodiment of the invention using a Mach-Zehnder interferometer arrangement to measure a phase shift in a probe photon state.

The measurement process illustrated above uses a homodyne measurement, which is highly efficient but generally requires the use of a strong local oscillator. FIG. 3B illustrates a measurement system 300B that uses a Mach-Zehnder interferometer including 50/50 beam splitters 321 and 323, reflectors 322 and 324, and photodiodes 326 and 328 to measure the phase shift in a coherent probe photon state $|\xi>$. In system 300B, 50/50 beam-splitter 321 splits the coherent state $|\xi>$ into a two-mode separable state $|\xi/\sqrt{2}>_X|\xi/\sqrt{2}>_Y$, where subscripts X and Y designate spatially separated paths. One mode $|\xi/\sqrt{2}>_X$ is input into photonic gate 110, where that mode $|\xi/\sqrt{2}>_X$ acquires a phase shift $e^{in\chi t}$ that depends on the number n of photons of angular frequency $\omega_a$ in target state $|T_{IN}>$. The phase shifted state $|\xi e^{in\chi t}/\sqrt{2}>_X$ from photonic gate 110 reflects from mirror 324 onto 50/50 beam splitter 323, which combines phase-shifted state $|\xi e^{in\chi t}/\sqrt{2}>_X$ with the second mode $|\xi/\sqrt{2}>_Y$ from beam splitter 321 via mirror 322. The output probe state after beam-splitter 323 is a two-mode state as indicated in Equation 7, where subscripts X and Y designate spatially separated paths to respective detectors 326 and 328.

$|P_{OUT}>_X|P_{OUT}>_Y=|(1+e^{in\chi t})\xi/2>_X|(1-e^{in\chi t})\xi/2>_Y$  Equation 7:

In the regime where $\chi t$ is small, the output probe state can be expressed as $|\xi(1+in\chi t/2)>_X|in\xi\chi t/2>_Y$, and a direct measurement of second mode $|in\xi\chi t/2>_Y$ using photodiode 328 gives a measurement current proportional to photon intensity $(n\xi\chi t)^2$. Photodiode 328 can be a conventional device that is unable to distinguish a single photon from zero or two photons, but photodiode 328 can distinguish between zero and a large number of photons. Assuming that the product $\xi\chi t$ is relatively large, photodiode 328 can distinguish whether output mode $|P_{OUT}>_Y$ has 0 or approximately $(\xi\chi t)^2$ photons. System 300B thus has enormous advantages over currently used detectors because the efficiency of system 300B detecting single photons is close to unity.

If target state $|T_{IN}>$ is a superposition of Fock states and of the form $c_0|0>_a+c_1|1>_a$, the state $|\Psi>$ of the total system after the beam splitter and EIT interaction is found to have the form given in Equation 8. If photodiode 328 measures a nonzero current, then Equation 8 indicates that target state $|T_{OUT}>$ includes a photon of angular frequency $\omega_a$.

$|\Psi>=c_0|0>_a|\xi>_{bX}|0>_{bY}+c_1|1>_a(1+e^{i\chi t})\xi/2>_X|(1-e^{i\chi t})\xi/2>_Y$  Equation 8:

If target state $|T_{IN}>$ is a superposition of Fock states and of the form $c_0|0>_a+c_1|1>_a+c_2|2>_a$, both component Fock states $|1>_a$ and $|2>_a$ include photons of angular frequency $\omega_a$ and therefore cause phase shifts. However, the magnitude of the resulting current in photodiode 328 easily distinguishes the phase shift resulting from component state $|1>_a$ from the phase shift resulting from component state $|2>_a$. As noted above, when $\chi t$ is small, the current measured in photodiode 328 is approximately proportional to $(n\xi\chi t)^2$. The current that photodiode 328 measures for component state $|2>_a$ is thus about four times the current measured for component state $|1>_a$.

In accordance with another aspect of the invention, measurement system 300B can be tuned to act as a parity detector for target state $|T_{IN}>$. As noted above, photodiode 328 measures a probe state $|(1-e^{in\chi t})\xi/2>_Y$. If photonic gate 110 is such that the quantity $\chi t$ is equal to $\pi$, then even photon numbers produce a phase shift that is a multiple of $2\pi$, which is effectively no phase shift. Only an odd photon number n photons in target state $|T_{IN}>$ causes a phase shift, which photodiode 328 detects as a non-zero current.

An advantage of measurement system 300B is that photodiode 328 measures light through a "dark port" that neglecting noise, has zero intensity unless a photon is in the target state. The presence of a photon in the target state thus provides a distinctive signal. However, an EIT system such as used in the exemplary embodiment of photonic gate 110 is always likely to have a limited amount of noise arising from decoherence and dephasing. Dephasing can cause a small phase shift in the probe state that would cause some light flow through the dark port of the Mach-Zehnder interferometer even when no target photon (e.g., of angular frequency $\omega_a$) is present. However, photodiode 328 can measure the amount of light (not just the presence of light) at the dark port, and proper tuning of the phase shift induced in photonic gate 110 can make the noise insignificant compared to the amount of light from the dark port when a single target photon is present. Photodiode 328 then distinguishes a few photons from many photons, which can be achieved using conventional photodiodes. If photonic gate 110 employs a photon loss mechanism to attenuate the probe photon state, the attenuation can similarly be maximized to distinguish the dark port signal from the noise.

Measurement systems 300A and 300B, as described above, are able to infer the presence or absence of a photon in a target state without directly measuring and destroying the photon. The photon from the target state can thus be used after the measurement.

In accordance with another aspect of the invention, a non-destructive measurement system 300A or 300B can convert a conventional, non-deterministic photon source that may sporadically or undependably emit a single photon into a deterministic photon source that releases a single photon on demand. The deterministic single photon source includes the conventional photon source, the non-destructive photon detector such as system 300A or 300B, and a photon storage system. The non-destructive photon detector measures the photon number for a state output from the conventional photon source. If the measured output state is not a single photon, another output photon state from the conventional photon source measured. If the measured photon state contains a single photon, the measured photon state is stored in the photon storage system, from which the single photon state can be released on demand. When the photon detector includes a photonic gate including an EIT system, the EIT system can introduce a phase shift in a probe state and store the target photon for later release. An array of N such dependable single photon sources of this type can store N photons and release a user-selected number of (e.g., 0 to N) photons on demand.

Figure 4:
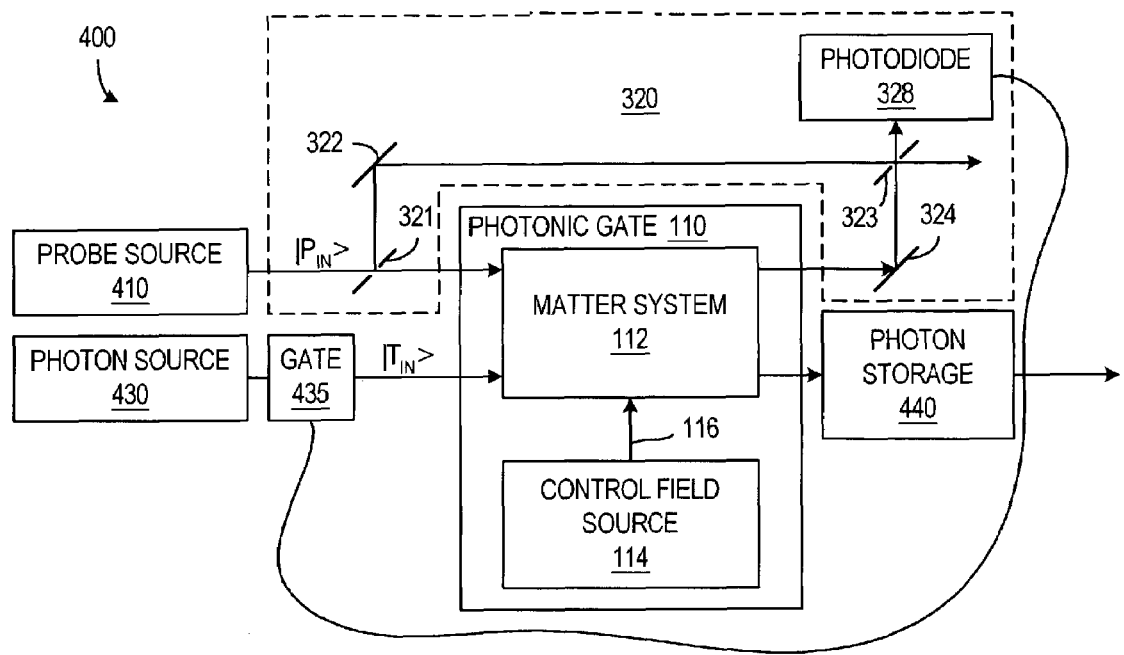
FIG. 4 is a block diagram of a single photon source in accordance with an embodiment of the invention.

FIG. 4 illustrates a deterministic single photon source 400 in accordance with a specific embodiment of the invention. Photon source 400 includes a photonic gate 110, a Mach-Zender interferometer 320, a non-deterministic photon source 430, and a photon storage system 440.

Non-deterministic photon source 430 sometimes emits a single photon of angular frequency $\omega_a$, but most of the time emits only the vacuum. Such a source can be, for example, an electrically triggered quantum dot or highly attenuated laser. The output of photon source 430 is measured to determine whether or not source 430 emitted a photon.

For the measurement, the output state of source 430 becomes the target state |T$_{IN}$⟩ that is input to photonic gate 110 for measurement. A laser or other probe source 410 simultaneously generates a coherent probe state |ξ⟩ containing photons of angular frequency $\omega_c$, and Mach-Zender interferometer 320 splits coherent probe state |ξ⟩ so that one spatial component is input to photonic gate 110 with target state |T$_{IN}$⟩. Photodiode 328 then determines whether target state |T$_{IN}$⟩ includes a single photon state by detecting whether photodiode 328 measures a signal that is above the noise level but below the level corresponding to a two photon target state.

If no photon is initially present in state |T$_{IN}$⟩, source 430 remains active until a single photon is detected. When the measured current from photodiode 328 confirms that target state|T$_{IN}$⟩ includes a single photon, the photon is stored in photon storage 440, and a gate 435 shuts off further output from photon source 430. Photon storage 440 can be a device such as a fiber loop or an EIT system capable of releasing a quantum coherent photon state matching the stored photon. The stored photon can be released from photon storage 440 to deterministically provide a single photon state on demand.

In accordance with another aspect of the invention, an EIT-based arrangement used in photonic gate 110, which causes the desired phase shift in the probe state, can also store a single photon of the target state. In particular, the duration of the probe state can be extended to effectively slow or stop propagation of the target photon through matter system 112 until an output photon is needed. Accordingly, a separate photon storage device 440 can be eliminated if matter system 112 serves to store the target photon.

Figure 5:
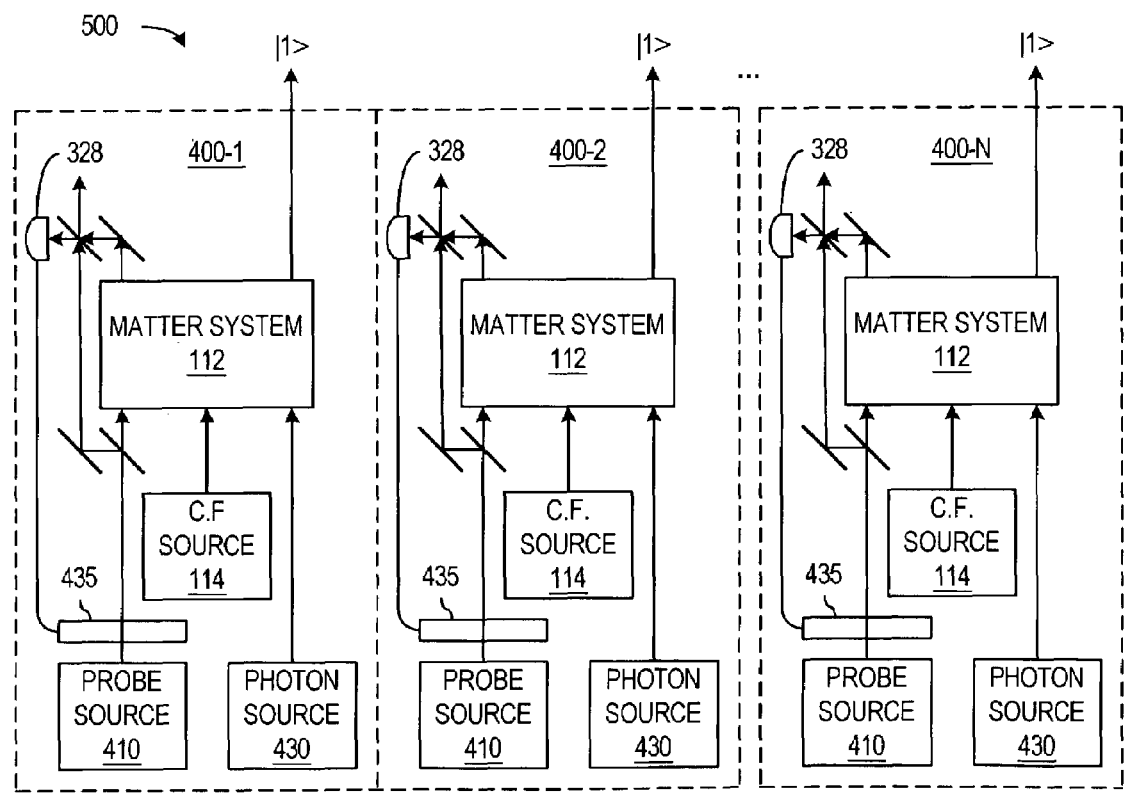
FIG. 5 is a block diagram of an N-photon source in accordance with an embodiment of the invention.

Multiple deterministic photon sources such as illustrated in FIG. 4 can be used together to produce a photon state containing a user-selected number of photons. FIG. 5 illustrates an example of an N-photon source 500 containing N single photon sources 400-1 to 400-N. Each of the single photon sources 400-1 to 400-N operates in the same manner as photon source 400 of FIG. 4 to detect and store a single photon. When photon sources 400-1 to 400-N all store single photons, any or all of the photon sources 400-1 to 400-N can be commanded to release a stored photon to produce a photon state having a user selected number of photons.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. A device comprising:
    a gate capable of receiving a target photon state and a probe photon state, wherein the gate creates in the probe photon state a change that depends on a number of photons in the target photon state; and
    a measurement system arranged to measure the change in the probe photon state to detect whether the target photon state includes one or more photons.

2. The device of claim 1, wherein the gate comprises a matter system having multiple energy levels, wherein photons used in the target photon state have an energy corresponding to a transition between two of the energy levels of the matter system, and photons used in the probe photon state have an energy corresponding to a transition between two of the energy levels of the matter system.

3. The device of claim 2, wherein:
    the matter system has four energy levels;
    the photons used in the target photon state have the energy corresponding to the transition between a first energy level of the matter system and a second energy level of the matter system; and
    the photons used in the probe photon state have the energy corresponding to the transition between a third energy level of the matter system and a fourth energy level of the matter system.

4. The device of claim 3, wherein the gate further comprises a source of a control field that drives the matter system with an electromagnetic field containing photons having an energy corresponding to a transition between the second energy level and the third energy level.

5. The device of claim 1, wherein the measurement system comprises:
    a first beam splitter positioned to split the probe photon state into a first spatial component and a second spatial component, the first spatial component being directed into the gate and a second spatial component being directed to bypass the gate;
    a second beam splitter positioned to recombine the first spatial component and the second spatial component after the first spatial component exits the gate; and
    a photodetector along a light path from the second beam splitter.

6. The device of claim 5, wherein the measurement system measures a number of photons in the target photon state by measuring a magnitude of a measurement of the photodetector.

7. The device of claim 5, wherein the probe photon state is a coherent state.

8. The device of claim 1, wherein the change comprises attenuation in an amplitude of the probe photon state.

9. The device of claim 1, wherein the change comprises a phase shift in the probe photon state.

10. The device of claim 9, wherein the phase shift in the probe photon state is equal to π times the number of photons in the target photon state, and the detector measures a parity of the target photon state.

11. The device of claim 1, wherein the gate causes a non-linear interaction between the target photon state and the probe photon state.

12. The device of claim 11, wherein the non-linear inaction comprises a crossed-Kerr non-linearity.

13. The device of claim 12, where the crossed-Kerr non-linearity arises from electromagnetically induced transparency created in a structure of the gate.

14. The device of claim 1, wherein the gate comprises:
    a first series of one or more optical gates that operate on the target photon state;
    a second series of one of more optical gates that operate on the probe photon state; and
    a beam splitter positioned to combine the target photon state and the probe photon state.

15. The device of claim 14, wherein the target photon state and the probe photon state correspond to spatially separated modes having the same frequency.

16. The device of claim 1, further comprising:
    a photon source that generates the target photon state and has chances of including 0 or 1 photon in the target photon state; and
    a photon storage system that stores the photon of the target photon state in response to the measurement system detecting that the target photon state includes 1 photon.

17. The device of claim 16, further comprising a switch connected to disable the photon source in response to the photon storage system storing the photon from the target photon state.

18. A method for detecting a number of photons in a target state, comprising:
- directing the target state and a probe state into a gate that causes a non-linear interaction between the target state and the probe state;
- measuring a change in the probe state that arises from the non-linear interaction; and
- inferring the number of photons in the target state from the change in the probe state.

19. The detector of claim 18, wherein the non-linear inaction comprises a crossed-Kerr non-linearity.

20. The detector of claim 19, further comprising generating electromagnetically induced transparency in a matter system in the gate, where the electromagnetically induced transparency causes the crossed-Kerr non-linearity.

21. The method of claim 18, wherein the gate comprises a matter system having multiple energy levels.

22. The method of claim 21, wherein each photon in the target state provides a coupling between a first energy level and a second energy level of the matter system.

23. The method of claim 22, further comprising:
- generating a coherent state using photons that provide a coupling between a third energy level and a fourth energy level of the matter system; and
- using the coherent state as the probe state.

24. The method of claim 18, wherein the change in the probe state comprises a phase shift.

25. The method of claim 18, wherein the change in the probe state comprises attenuation of an amplitude of the probe state.

26. The method of claim 18, wherein measuring the change in the probe state comprises interfering the probe state with a reference beam.

27. The method of claim 18, wherein measuring the change in the probe state comprises:
- splitting the probe state so that a first spatial component of the probe state interacts with the target state;
- combining the first spatial component of the probe state with a second spatial component of the probe state to create an interference; and
- measuring the interference to detect the change in the probe state.

28. A device comprising a set of single photon sources, wherein each single photon source comprises:
- a photon source that generates a target state that has chances of including 0 or 1 photon; and
- a gate position to receive the target state and a probe state, wherein the gate creates in the probe state a change that depends on a number of photons in the target state;
- a measurement system arranged to measure the change in the probe state to detect whether the target state includes one or more photons; and
- a photon storage system that stores the photon of the target state in response to the measurement system detecting that the target state includes 1 photon.

29. The device of claim 28, wherein the photon storage system comprises a matter system in the gate, wherein the matter system is configured to provide electromagnetically induced transparency for the target state and the probe state, and stores the target state during the duration of the probe state.

* * * * *

UNITED STATES PATENT AND TRADEMARK OFFICE
CERTIFICATE OF CORRECTION

PATENT NO. : 6,989,523 B2 Page 1 of 1
APPLICATION NO. : 10/412019
DATED : January 24, 2006
INVENTOR(S) : Raymond G. Beausoleil et al.

It is certified that error appears in the above-identified patent and that said Letters Patent is hereby corrected as shown below:

In column 4, line 63, delete "$(a^{\dagger}a)^{\lambda}$" and insert -- $(a^{\dagger}a)^{\lambda}$ --, therefor.

Signed and Sealed this

Thirteenth Day of April, 2010

David J. Kappos
*Director of the United States Patent and Trademark Office*